(12) United States Patent
Soya

(10) Patent No.: US 6,862,081 B2
(45) Date of Patent: Mar. 1, 2005

(54) SHEET TRANSPORTING APPARATUS

(75) Inventor: Takashi Soya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/656,365

(22) Filed: Sep. 8, 2003

(65) Prior Publication Data
US 2004/0114128 A1 Jun. 17, 2004

(30) Foreign Application Priority Data
Sep. 10, 2002 (JP) ........................................ 2002-263764

(51) Int. Cl.⁷ .......................... G03B 27/00; G03B 27/52
(52) U.S. Cl. ........................................ 355/407; 355/40
(58) Field of Search ............................ 355/40–41, 407; 271/228

(56) References Cited
U.S. PATENT DOCUMENTS

| | | | |
|---|---|---|---|
| 5,534,987 A | 7/1996 | Ohtsuka et al. | 355/285 |
| 5,609,428 A * | 3/1997 | Tanaka et al. | 400/579 |
| 5,747,774 A | 5/1998 | Suzuki et al. | 219/216 |
| 5,874,710 A | 2/1999 | Yoshimoto et al. | 219/216 |
| 5,918,876 A * | 7/1999 | Maruyama et al. | 271/228 |
| 6,059,285 A * | 5/2000 | Suga et al. | 271/228 |
| 6,518,546 B2 | 2/2003 | Otsuka et al. | 219/216 |

* cited by examiner

Primary Examiner—Henry Hung Nguyen
(74) Attorney, Agent, or Firm—Fitzpatrick, Cella, Harper & Scinto

(57) ABSTRACT

An image forming apparatus having a pair of sheet transporting members having rotary shafts on the same axis in a direction perpendicular to the transport direction of a sheet, and rotatively driven independently of each other to thereby transport the sheet, a detector provided along a cross direction perpendicular to the transport direction of the sheet for detecting the transported state of the sheet transported by the sheet transporting members, and a controller for drive-controlling the pair of sheet transporting members on the basis of the detection information of the detector, and effecting the correction of a sheet position in the cross direction and the correction of the skew feed posture of the sheet relative to the transport direction.

8 Claims, 13 Drawing Sheets

SHEET TRANSPORTING APPARATUS

BACKGROUND OF THE INVENTION

1. Field of the Invention

The invention relates to a sheet transporting apparatus, and particularly to the correction of the position of a sheet in the cross direction thereof perpendicular to a sheet transport direction and the correction of the skew feed posture of the sheet relative to the sheet transport direction.

2. Description of the Related Art

In an image forming apparatus such as a copying machine, or an image reading apparatus, a registration (skew feed correction) device for the posture correction and alignment of a sheet being transported is provided immediately before the image forming portion or the image reading portion thereof. As such a registration device, there is, for example, an active registration system for correcting the skew feed of a sheet while transporting the sheet. This system is such that two original detecting sensors are disposed in a sheet transport path in the cross direction (hereinafter referred to as the main scan direction) of the sheet perpendicular to a sheet transport direction, and detect the skew of the leading edge of the sheet on the basis of a signal produced by the leading edge of the sheet crossing the respective sensors, and also the sheet transporting speed of skew feed correction rollers (hereinafter referred to as the registration rollers) disposed in the main scan direction and drivable independently of each other is controlled to thereby correct the skew feed of the sheet.

According to this system, skew feed correction can be effected while the sheet is transported without being once stopped and therefore, the throughput of the sheet is not reduced. FIG. 13 of the accompanying drawings is a typical view illustrating a method of correcting the skew feed of a sheet transported by the active registration system.

As the above-described conventional skew feed correction control method, there is an acceleration and deceleration control method or the like as shown in FIG. 13 wherein a transport roller 14 on one side preceding by skew feed is deceleratedly driven (the arrow D in FIG. 13) and at the same time, the accelerated drive of a transporting roller 13 (the arrow A in FIG. 13) on the other side delayed is effected.

On the other hand, the skew feed direction, the detected skew feed amount (Nb), etc. of an original transported by rollers 13 and 14 are measured by original detecting sensors 15 and 16. As drive sources for rotatively driving the rollers 13 and 14, use is usually made of pulse motors 11 and 12, and the aforementioned detected skew feed amount Nb is measured by counting the time from after one of the original detecting sensors 15 and 16 has detected the original until the other sensor detects the original, by counting clocks driving the pulse motors 11 and 12.

Further, the original detecting sensors 15 and 16 are disposed at distances equal from the center of the main scan direction to the right and left and therefore, there is the characteristic that when skew feed control is effected in conformity with the detected skew feed amount Nb calculated from the detection information of these detecting sensors 15 and 16, the transport of the original in the central portion of the main scan direction of the original does not differ from the ordinary transport thereof, in the case of the acceleration and deceleration control method.

However, an improvement in the sheet transporting speed has sometimes caused, in addition to the skew feed of the sheet, the deviation of the sheet position in the main scan direction.

By the conventional active registration system, it has been impossible to detect the deviation of the sheet position in the main scan direction and therefore, to correct the deviation of the sheet position.

SUMMARY OF THE INVENTION

The present invention has been made in view of the above-noted problem and an object thereof is to provide a sheet transporting apparatus which can efficiently effect the correction of the positional deviation of a sheet in the main scan direction and the correction of the skew feed of the sheet.

(1) In order to achieve the above object, a sheet transporting apparatus according to the present invention has a pair of sheet transporting members having rotary shafts on the same axis in a direction perpendicular to the transport direction of a sheet and rotatively driven independently of each other to thereby transport the sheet, detecting means provided along a cross direction perpendicular to the sheet transport direction for detecting the transported state of the sheet transported by the sheet transporting members, and control means for drive-controlling the pair of sheet transporting members on the basis of the detection information of the detecting means, and effecting the correction of a sheet position in the cross direction and the correction of the skew feed posture of the sheet relative to the transport direction.

(2) In the above item (1), the control means may preferably give a transporting speed difference between the pair of transporting members.

(3) In the above item (1), the detecting means may preferably be a line sensor disposed in parallelism to the cross direction and the size of a detectable area in the cross direction by the line sensor may preferably be larger than the size of at least an area through which the sheet passes when transported in the cross direction.

(4) In the above item (1), the detecting means may preferably be disposed upstream of the pair of transporting members with respect to the sheet transport direction.

(5) In the above item (1), the detecting means may preferably be disposed downstream of the pair of transporting members with respect to the sheet transport direction.

(6) In the above item (1), the control means may preferably effect deviation correction control in the cross direction and skew feed direction of the sheet caused by the pair of transporting members in parallel with each other.

(7) In the above item (1), the sheet transporting apparatus may preferably have calculating means for calculating the movement direction and the movement amount of the sheet in the cross direction, and the skew feed direction and the skew feed amount of the sheet, relative to a normal transport position, on the basis of the detection information of the detecting means.

(8) In the above item (7), the calculating means may preferably calculate the skew feed direction and the skew feed amount after the deviation correction control in the cross direction of the sheet to thereby calculate a total skew feed direction and a total skew feed amount, and the control means may preferably effect the deviation correction control in the skew feed direction of the sheet on the basis of the total skew feed direction and the total skew feed amount.

Other objects and features of the present invention will become apparent from the following description and the accompanying drawings.

DESCRIPTION OF THE PREFERRED EMBODIMENTS

First Embodiment

Description will first be made of a first embodiment of a sheet transporting apparatus which achieves the objects of the present invention.

Figure 1:
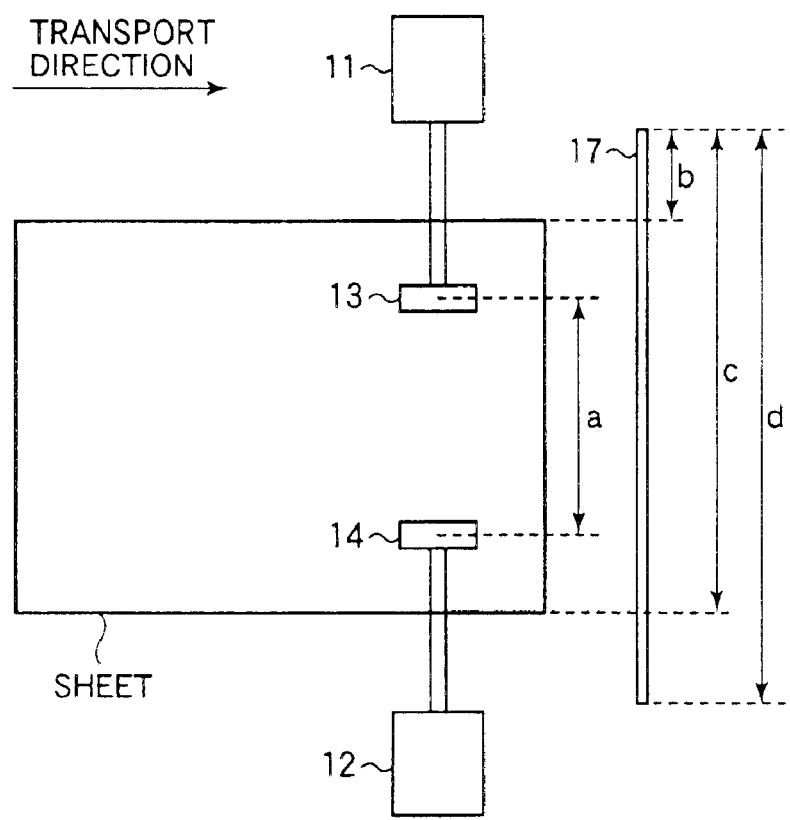
FIG. 1 is a schematic view showing the construction of the essential portions of a first embodiment of the present invention.
Figure 13:
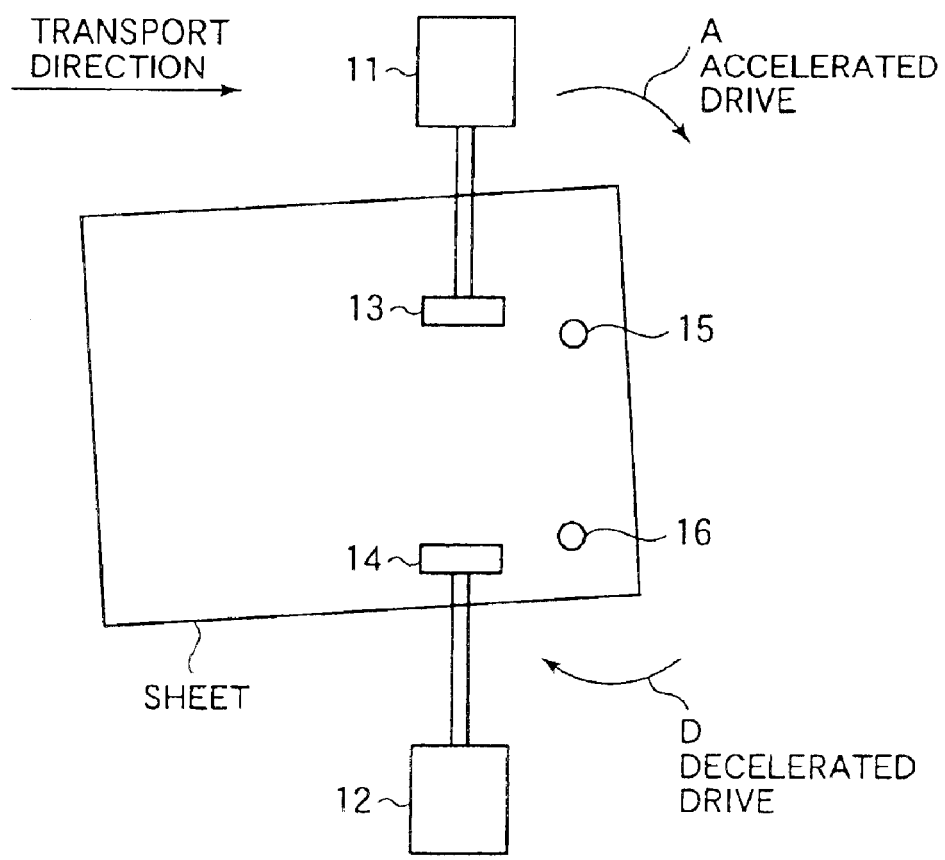
FIG. 13 is a typical view illustrating a method of correcting the skew feed of a sheet transported by a conventional sheet transporting apparatus.

FIG. 1 is a schematic view illustrating the construction of the essential portions of the sheet transporting apparatus according to the present embodiment. In FIG. 1, the same members as the members shown in FIG. 13 are given the same reference numerals.

In FIG. 1, the sheet transporting apparatus according to the present embodiment has transporting rollers 13 and 14 frictionally contacting with a sheet to thereby transport the sheet in a predetermined transport direction, and a sheet detecting line sensor 17, which is perpendicular to the transport direction of the sheet and disposed at a distance equal from the center of a transport path along which the sheet is normally transported to the right and left in order to measure the deviation amount and deviation direction in a direction perpendicular to the sheet transport direction (hereinafter referred to as the main scan direction), and a skew feed direction and a skew feed amount N. Also, this sheet detecting line sensor 17 is disposed downstream of the transporting rollers 13 and 14 in the transport path of the sheet.

Also, the transporting rollers 13 and 14 each have a center of rotation on a straight line extending in the main scan direction (cross direction) on the transport path of the sheet, and are disposed in opposed relationship with each other with an interval of a distance "a" therebetween, and are directly connected to pulse motors 11 and 12, respectively, and are drive-controlled independently of each other.

The detectable area "d" by the sheet detecting line sensor 17 is wider than at least the widthwise length of the transport path of the sheet.

Figure 2:
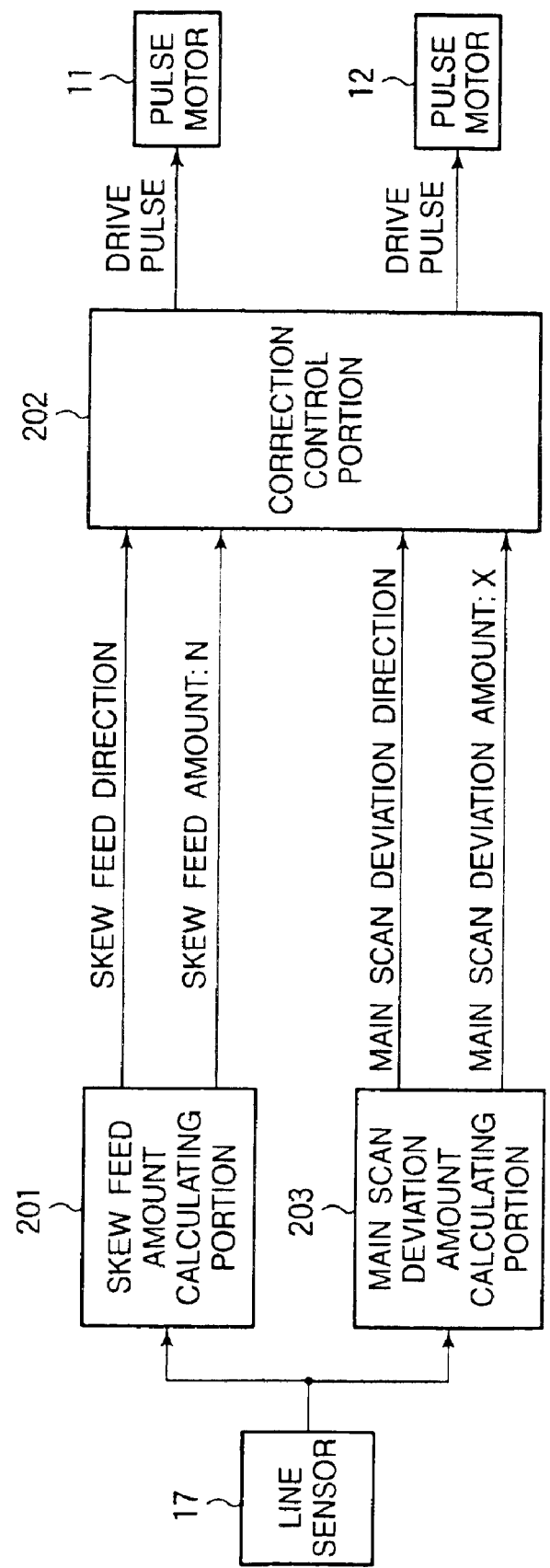
FIG. 2 is a block diagram showing the control construction of the sheet transporting apparatus of FIG. 1.

FIG. 2 is a block diagram illustrating the control construction of the sheet transporting apparatus according to the present embodiment. In FIG. 2, a skew feed amount calculating portion 201 calculates the skew feed direction and skew feed amount N of the sheet being transported relative to the normal transport posture thereof on the basis of detection information from the sheet detecting line sensor 17. A main scan deviation amount calculating portion 203 calculates a main scan deviation direction which is a direction deviating from a normal transport position in the cross direction of the sheet, and a main scan deviation amount X which is a deviation amount in the main scan deviation direction, on the basis of the detection information from the sheet detecting line sensor 17.

A correction control portion 202 controls driving pulse numbers individually given to the pulse motors 11 and 12, and corrects the main scan deviation amount and skew feed amount of the sheet during transport, on the basis of the signals of the skew feed direction and the skew feed amount N transmitted from the skew feed amount calculating portion 201, and the signals of the main scan deviation direction and the main scan deviation amount X transmitted from the main scan deviation amount calculating portion 203.

Each of the skew feed amount calculating portion 201, the correction control portion 202 and the main scan deviation amount calculating portion 203 may be comprised, for example, of a controller provided with a CPU, a ROM, a RAM etc., and storing therein a program for effecting various kinds of control in accordance with the procedure of a flow chart which will be described later.

Figure 3A:
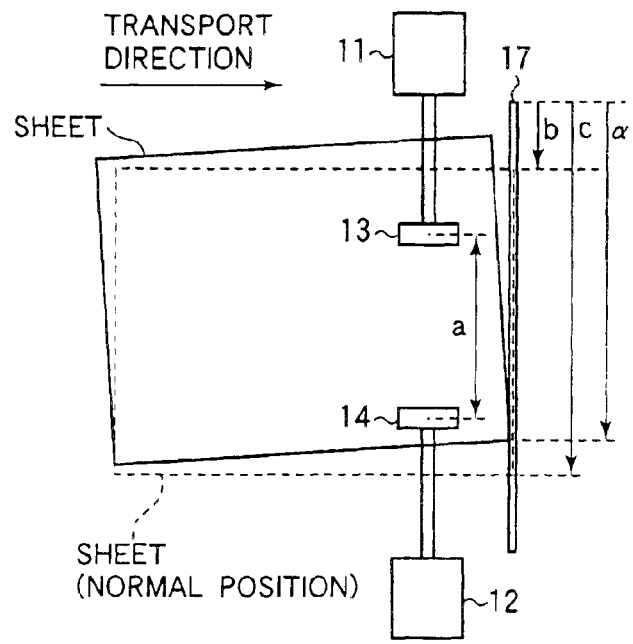
FIGS. 3A and 3B are typical views illustrating a main scan deviation detecting method and a skew feed detecting method in the sheet transporting apparatus of FIG. 1.
Figure 3B:
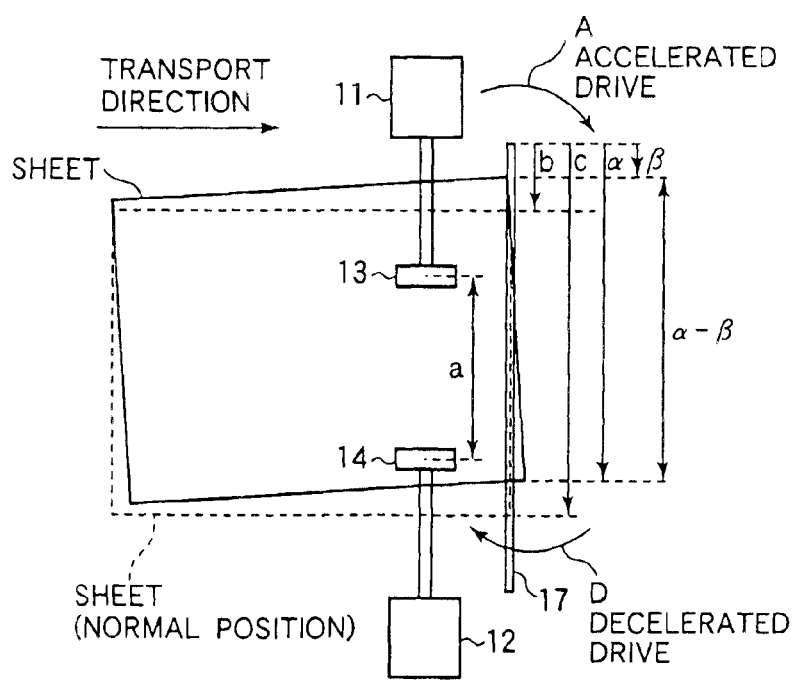

FIGS. 3A and 3B are typical views illustrating a method of detecting the main scan deviation direction, the main scan direction amount X, the skew feed direction and the skew feed amount N (hereinafter referred to as the transported state) of the sheet in the sheet transporting apparatus according to the present embodiment, and in these figures, the same portions are given the same reference numerals and need not be described.

For the calculation of the main scan deviation amount X, when first, with one side (the pulse motor 11 side) of the sheet detecting line sensor 17 as the reference, as shown in FIG. 3A, the position at which the sheet detecting line sensor 17 has first detected the sheet is defined as α, and the normal positions in the main scan direction which the sheet should originally pass are defined as "b" and "c" ("b" is the position of the end portion of the sheet on the pulse motor 11 side, and "c" is the position of the end portion of the sheet on the pulse motor 12 side), the main scan deviation amount X can be obtained from $$X = c - \alpha \text{ (or } X = b - \alpha\text{)}.$$

Next, for the calculation of the skew feed amount N, when after the sheet portion has first been detected by the sheet detecting line sensor 17, as shown in FIG. 3B, the position at which the detected position of the sheet by the sheet detecting line sensor 17 assumes a minimum value (or a maximum value) is defined as β, the time until the position β is assumed is counted at a constant frequency "f" to thereby measure a detected skew feed count number C.

Next, a detected skew feed amount Nb detected by the sheet detecting line sensor 17 is calculated from Nb=C×V/f by the use of transporting speed V of the sheet. Then, the skew feed amount N in the transporting roller portion actually used for the correction control portion 202 to control the pulse motors 11 and 12 is calculated from N=Nb×($\alpha$-$\beta$)/a by the use of the detected skew feed amount Nb detected by the sheet detecting line sensor and the distance between the transporting rollers 13 and 14.

The correction control portion 202 then controls the driving pulses of the pulse motors 11 and 12 on the basis of the thus obtained transport state to thereby correct the main scan deviation amount and skew feed amount of the transported sheet.

A correction control method for the main scan deviation amount and the skew feed amount in the sheet transporting apparatus according to the present embodiment will hereinafter be described with reference to a flow chart shown in FIG. 4.

In the case of FIGS. 3A and 3B, the sheet is in a skew feed posture rotated leftwardly relative to its normal position and therefore, the corner portion of the sheet which is far from the reference position of the sheet detecting line sensor 17 is first detected and the value thereof becomes a maximum value, but in an opposite skew feed posture, the corner portion of the sheet which is near is first detected and therefore the value thereof becomes a minimum value.

Figure 4:
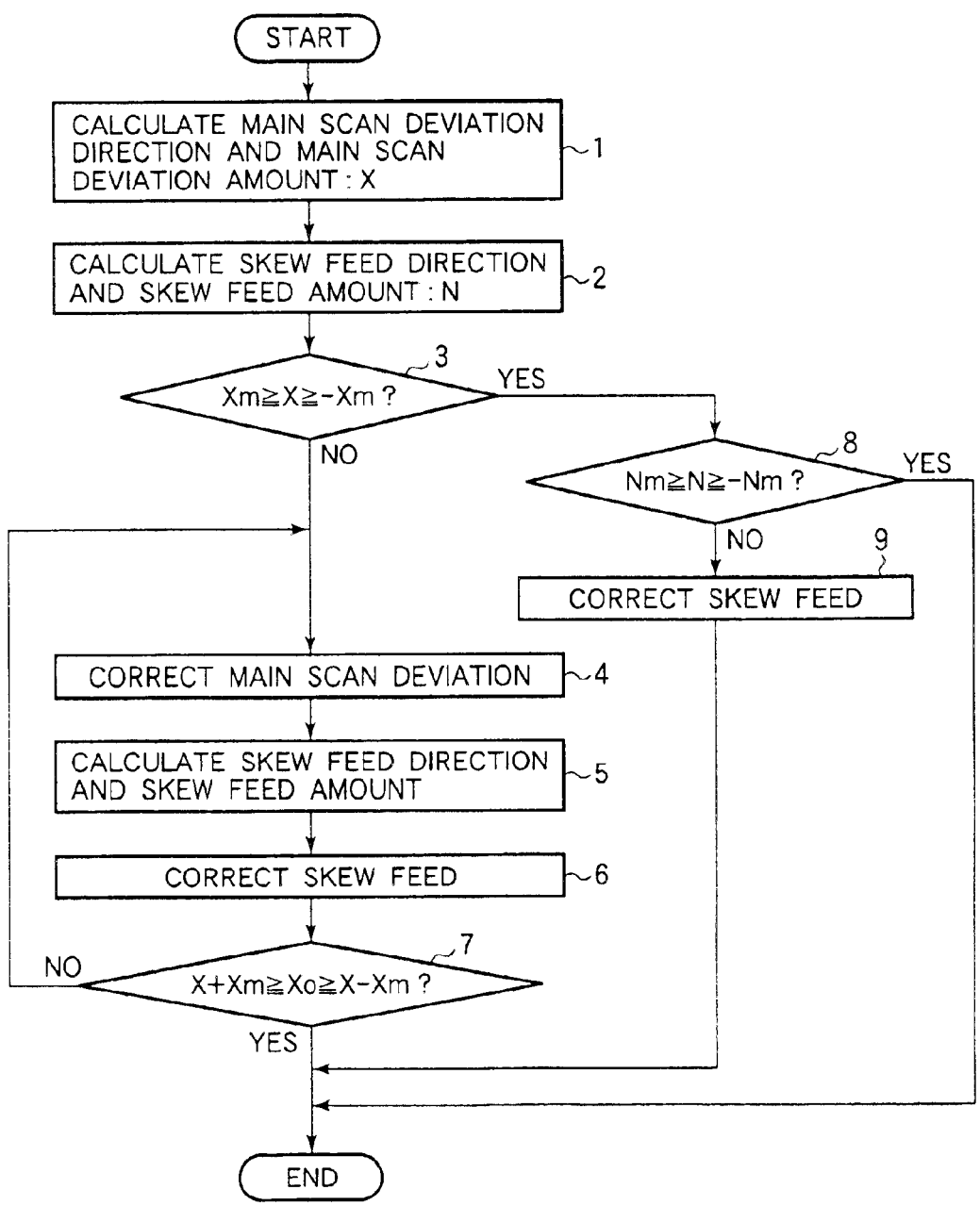
FIG. 4 is a flow chart illustrating the control procedure of effecting main scan deviation correction and skew feed correction in the first embodiment of the present invention.

In FIG. 4, the main scan deviation correction amount obtained on the basis of the main scan deviation amount X is represented by Xo, the main scan deviation allowable value determining the allowable range of the main scan deviation amount X is represented by Xm, and the skew feed allowable value determining the allowable range of the skew feed amount N is represented by Nm.

When at a step 1, the sheet detecting line sensor 17 detects the sheet, the main scan deviation amount calculating portion 203 calculates the main scan deviation direction and the main scan deviation amount X.

When at a step 2, the detected position of the sheet by the sheet detecting line sensor 17 has assumed a minimum value (or a maximum value), the skew feed amount calculating portion 201 calculates the skew feed direction and the skew feed amount N.

At a step 3, the correction control portion 202 judges whether the main scan deviation amount X is within a range of $-Xm \leq X \leq Xm$, and when it is judged to be within this allowable range, at a step 8, the correction control portion 202 judges whether the skew feed amount N is within an allowable range of $-Nm \leq N \leq Nm$, and when it is judged to be within the allowable range processing is ended.

On the other hand, when at the step 3, the main scan deviation amount X is judged to be not within the allowable range of $-Xm \leq X \leq Xm$, at a step 4, the correction of the main scan deviation amount (hereinafter referred to as the main scan deviation correction) is effected for a predetermined period by the correction control portion 202.

Then, at a step 5, a total skew feed amount is calculated from the skew feed amount caused by the main scan deviation correction and the skew feed amount calculated by the skew feed amount calculating portion 201, and at a step 6, the correction of the total skew feed amount (hereinafter referred to as the skew feed correction) is effected by the correction control portion 202.

Subsequently, at a step 7, the correction control portion 202 judges whether the main scan deviation correction amount Xo is within an allowable range of $X-Xm \leq Xo \leq X+Xm$, and when it is judged to be within the allowable range, processing is ended.

When at the step 7, the main scan deviation correction amount correction Xo is judged to be not within the allowable range of $X-Xm \leq Xo \leq X+Xm$, return is made to the step 4, where the main scan deviation correction is again effected for a predetermined period by the correction control portion 202, whereafter similar steps are executed.

When at a step 8, the skew feed amount N is judged to be not within the allowable range of $-Nm \leq N \leq Nm$, at a step 9, the skew feed correction is effected by the correction control portion 202 by an amount corresponding to the skew feed amount N calculated by the skew feed amount calculated portion 201, and processing is ended.

As described above, according to the present embodiment, the pulse motors 11 and 12 are drive-controlled in conformity with the transported state of the sheet calculated on the basis of the detection information of the transported sheet to thereby effect the widthwise deviation correction and the skew feed correction, whereby the sheet can be corrected into its normal transported state and be transported.

Second Embodiment

A second embodiment will now be described. While in the above-described first embodiment, description has been made of the correction control in which the main scan deviation correction and the skew feed correction are repeated and effected little by little on the basis of the deviation direction in the main scan direction, the deviation amount in the main scan direction, the skew feed direction and the skew feed amount calculated by detecting the sheet transported sheet by the sheet detecting line sensor as the sheet detecting means downstream of the transporting rollers as the driving means for transporting the sheet, in the present embodiment, the sheet detecting line sensor 17 as the sheet detecting means is disposed upstream of the transporting rollers as the sheet driving means with respect to the transport direction, and design is made so as to effect the main scan deviation correction and the skew feed correction by transporting rollers downstream of the sheet detecting line sensor 17 with respect to the transport direction, i.e., transporting rollers discrete from the transporting rollers which have caused skew feed, on the basis of the deviation direction in the main scan direction, the deviation amount in the main scan direction, the skew feed direction and the skew feed amount calculated by detecting the sheet.

Figure 5:
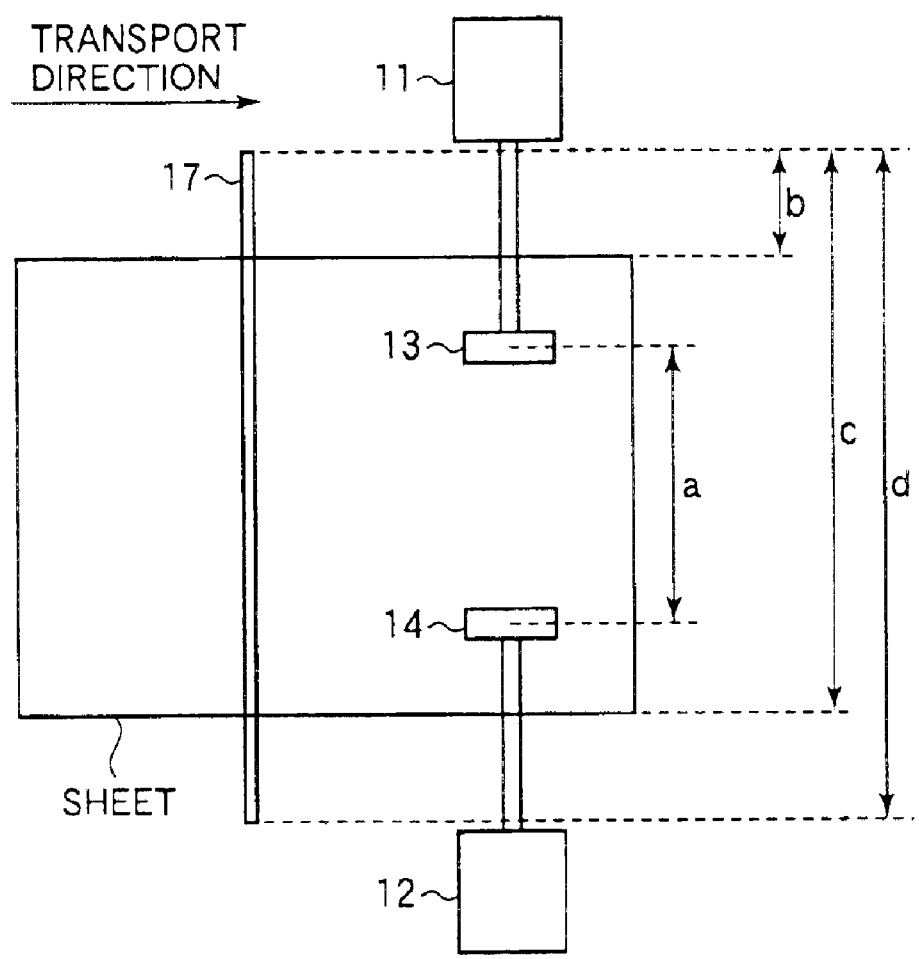
FIG. 5 is a schematic view illustrating the construction of the essential portions of a second embodiment of the present invention.

FIG. 5 is a schematic view illustrating the construction of the essential portions of a sheet transporting apparatus according to the present embodiment, and in FIG. 5, the above-described portions are given the same reference numerals and need not be described. The sheet detecting line sensor 17 in the present embodiment is disposed upstream of the transporting rollers 13 and 14 for effecting the main scan deviation correction and the skew feed correction on the transport path of the sheet with respect to the transport direction, and effects the detection of the transported state of the sheet transported by transporting means, not shown.

Figure 6:
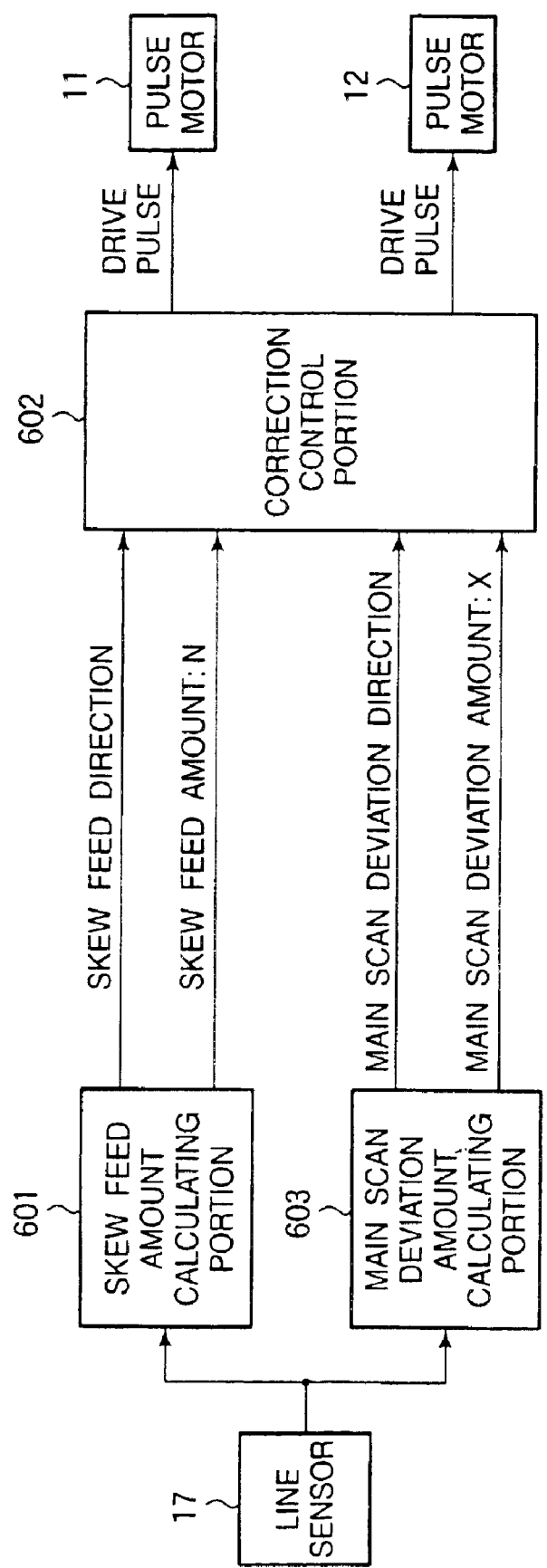
FIG. 6 is a block diagram illustrating the control construction of the second embodiment of the present invention.

FIG. 6 is a block diagram illustrating the control construction of the sheet transporting apparatus according to the present embodiment.

In FIG. 6, the reference numeral 601 designates a skew feed amount calculating portion which calculates the skew feed direction and skew feed amount N of the sheet on the basis of detection information from the sheet detecting line sensor 17. The reference numeral 603 denotes a main scan deviation amount calculating portion which calculates the main scan deviation direction and main scan deviation amount X of the sheet on the basis of the detection information from the sheet detecting line sensor 17. A correction control portion 602 controls driving pulse numbers given to the pulse motors 11 and 12 on the basis of the signals of the skew feed direction and the skew feed amount N transmitted from the skew feed amount calculating portion 601, and the main scan deviation direction and the main scan deviation amount X transmitted from the main scan deviation amount calculating portion 603, and corrects the main scan deviation amount and skew feed amount of the transported sheet.

Each of the skew feed amount calculating portion 601, the correction control portion 602 and the main scan deviation amount calculating portion 603 may be comprised, for example, of a controller provided with a CPU, a ROM and a RAM, and may be controlled in accordance with the procedure of a flow chart which will be described later.

Figure 7A:
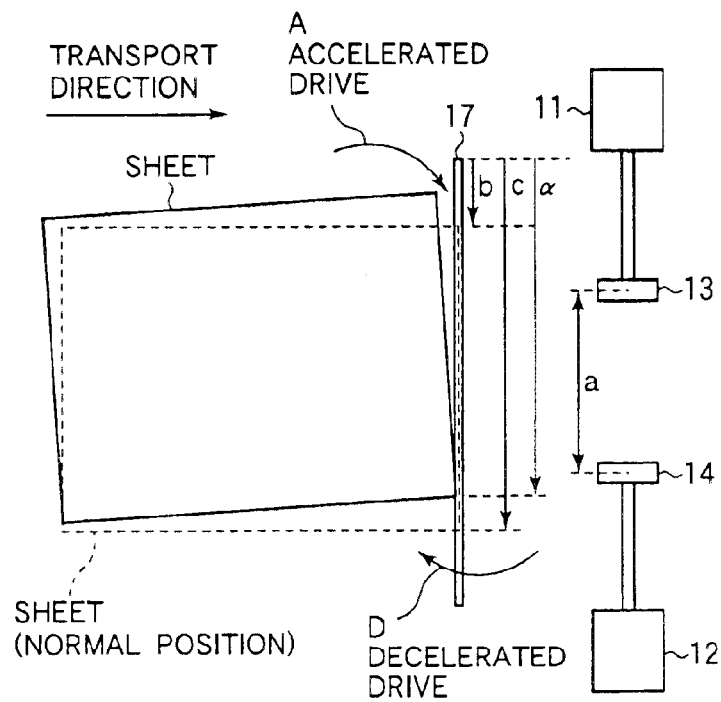
FIGS. 7A and 7B are typical views illustrating a main scan deviation detecting method and a skew feed detecting method in the second embodiment of the present invention.
Figure 7B:
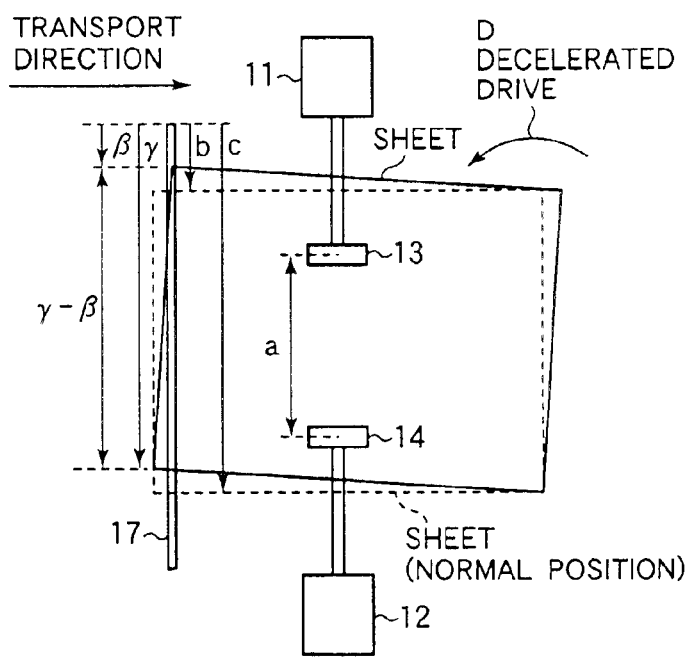

FIGS. 7A and 7B are typical views illustrating a method of detecting the transported state of the sheet in the sheet transporting apparatus according to the present embodiment, and in these figures, the same members as the above-described members are given the same reference numerals and need not be described.

For the calculation of the main scan deviation amount X, first, when the position at which the sheet has first been detected by the sheet detecting line sensor 17 is defined as $\alpha$, and the normal widthwise positions which the sheet should originally passes at the sheet detecting line sensor 17 are defined as "b" and "c" ("b" is the position of the end portion of the sheet on the pulse motor 11 side, and "c" is the position of the end portion of the sheet on the pulse motor 12 side), X is calculated from $$X = c - \alpha \text{ (or } X = b - \alpha\text{)}.$$

For the calculation of the skew feed amount N, a position $\beta$ at which the detected position of the sheet by the sheet detecting line sensor 17 assumes a minimum value (or a maximum value) and the time until the sheet becomes undetected by the sheet detecting line sensor 17 are counted at a constant frequency "f" to thereby measure a detected skew feed count number C. Also, the position at which the sheet has been detected lastly by the sheet detecting line sensor 17 is defined as Y.

Next, the detected skew feed amount Nb in the sheet detecting line sensor 17 itself is calculated from $Nb = C \times V/f$ by the use of the transporting speed of the sheet. The skew feed amount N in the transporting roller portion actually used for the correction control portion 602 to control the pulse motors 11 and 12 is calculated from $N = Nb \times (Y - \beta)/a$ by the use of the detected skew feed amount Nb detected by the sheet detecting line sensor and the distance "a" between the transporting rollers.

The correction control portion 602 controls driving pulse numbers given to the pulse motors 11 and 12 on the basis of the signals of the thus obtained skew feed direction and skew feed amount N, and the main scan deviation direction and the main scan deviation amount X, and corrects the main scan deviation amount and skew feed amount of the transported sheet.

A method of correcting the main scan deviation amount and skew feed amount in the sheet transporting apparatus according to the present embodiment will hereinafter be described with reference to a flow chart shown in FIG. 8.

Figure 8:
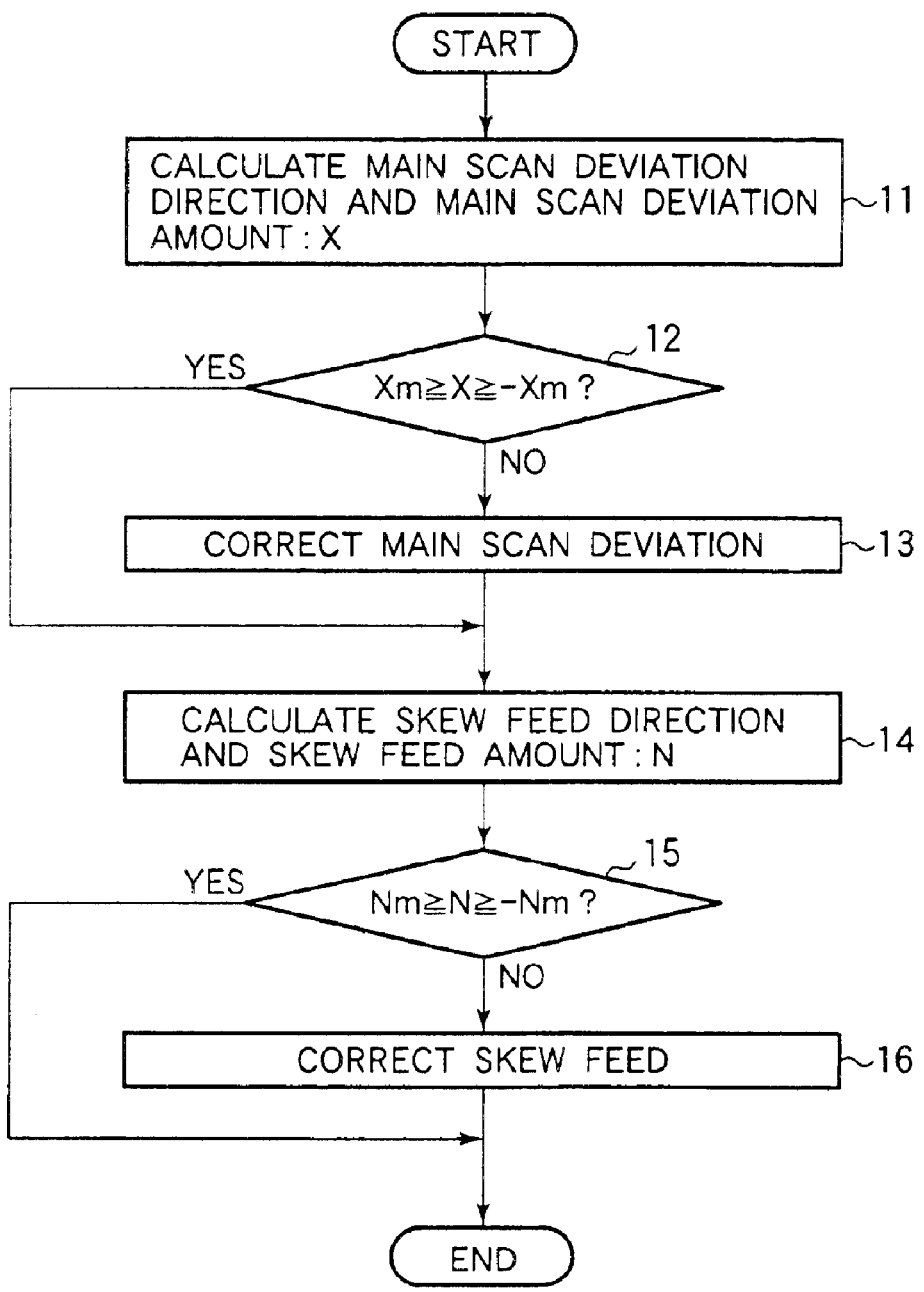
FIG. 8 is a flow chart illustrating the control procedure of effecting main scan deviation correction and skew feed correction in the second embodiment of the present invention.

FIG. 8 is a flow chart illustrating the procedure of correcting the main scan deviation amount and skew feed amount in the sheet transporting apparatus according to the present embodiment.

A main scan deviation allowable value determining the allowable range of the main scan deviation amount X is represented by Xm, and a skew feed allowable value determining the allowable range of the skew feed amount N is represented by Nm.

At a step 11, when the sheet detecting line sensor 17 detects the sheet, the main scan deviation amount calculating portion 603 calculates the main scan deviation direction and the main scan deviation amount X.

At a step 12, the correction control portion 602 judges whether the main scan deviation amount X is within an allowable range of $-Xm \leq X \leq Xm$, and when it is judged to be within the allowable range, the main scan deviation correction is not effected, but the sheet is intactly transported.

Next, when at a step 14, the detected position of the sheet by the sheet detecting line sensor 17 assumes a minimum value (or a maximum value) and thereafter the sheet becomes undetected by the sheet detecting line sensor 17, the skew feed amount calculating portion 601 calculates the skew feed direction and the skew feed amount N. Subsequently, at a step 15, the correction control portion 602 judges whether the skew feed amount N is within an allowable range of $-Nm \leq N \leq Nm$, and when it is judged to be within the allowable range, processing is ended.

On the other hand, when at the step 12, the main scan deviation amount X is judged to be not within the allowable range of $-Xm \leq X \leq Xm$, at a step 13, the main scan deviation correction is effected by the correction control portion 602 by an amount corresponding to the main scan deviation amount X calculated by the main scan deviation amount calculating portion 603, whereafter the sheet is transported.

When at the step 15, the skew feed amount N is judged to be not within the range $-Nm \leq N \leq Nm$, at a step 16, the skew feed correction is effected by the correction control portion 602 by an amount corresponding to the skew feed amount N calculated by the skew feed amount calculating portion 601, and processing is ended.

As described above, according to the present embodiment, the sheet detecting line sensor as the detecting means is disposed upstream of the transporting rollers 13 and 14 with respect to the transport direction, and the pulse motors 11 and 12 are drive-controlled in conformity with the transported plate obtained on the basis of the detection information of the transported sheet to thereby effect the widthwise deviation correction, whereafter the skew feed correction is effected, whereby the sheet can be transported with the main scan deviation and skew feed thereof corrected.

Third Embodiment

A third embodiment will now be described. While in the above-described first embodiment, description has been made of the correction control in which the main scan deviation correction and the skew feed correction are repeated and effected little by little on the basis of the deviation direction of the main scan direction, the deviation amount of the main scan direction, the skew feed direction and the skew feed amount calculated by detecting the transported sheet by the sheet detecting line sensor as the sheet detecting means downstream of the transporting rollers as the driving means for transporting the sheet, the present embodiment is designed such that the main scan deviation correction is effected on the basis of the deviation direction of the main scan direction, the deviation amount of the main scan direction, the skew feed direction and the skew feed amount calculated by detecting the transported sheet, whereafter a total skew feed amount is calculated from the aforementioned calculated skew feed amount and the skew feed amount caused by the main scan deviation correction to thereby effect the skew feed correction.

In the present embodiment, the main scan deviation correction is effected on the basis of the transported state obtained by detecting the transported sheet, whereafter the total skew feed amount is calculated from the aforementioned calculated skew feed amount and the skew feed amount caused by the main scan deviation correction to thereby effect the skew feed correction.

Figure 9:
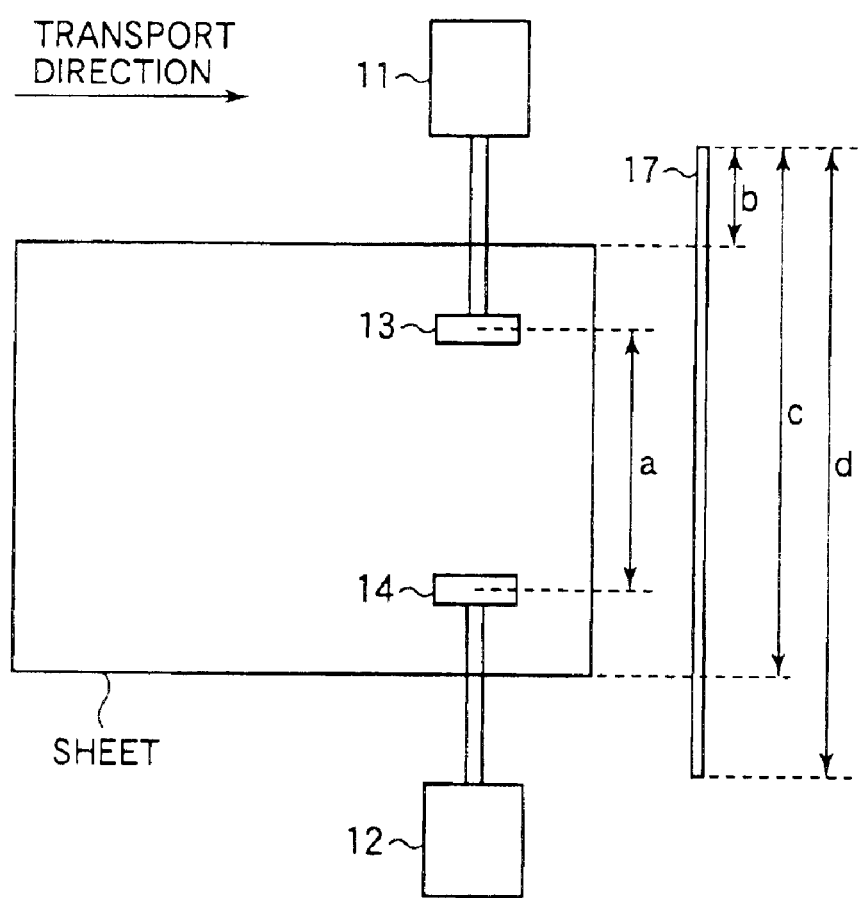
FIG. 9 is a schematic view illustrating the construction of the essential portions of a third embodiment of the present invention.
Figure 10:
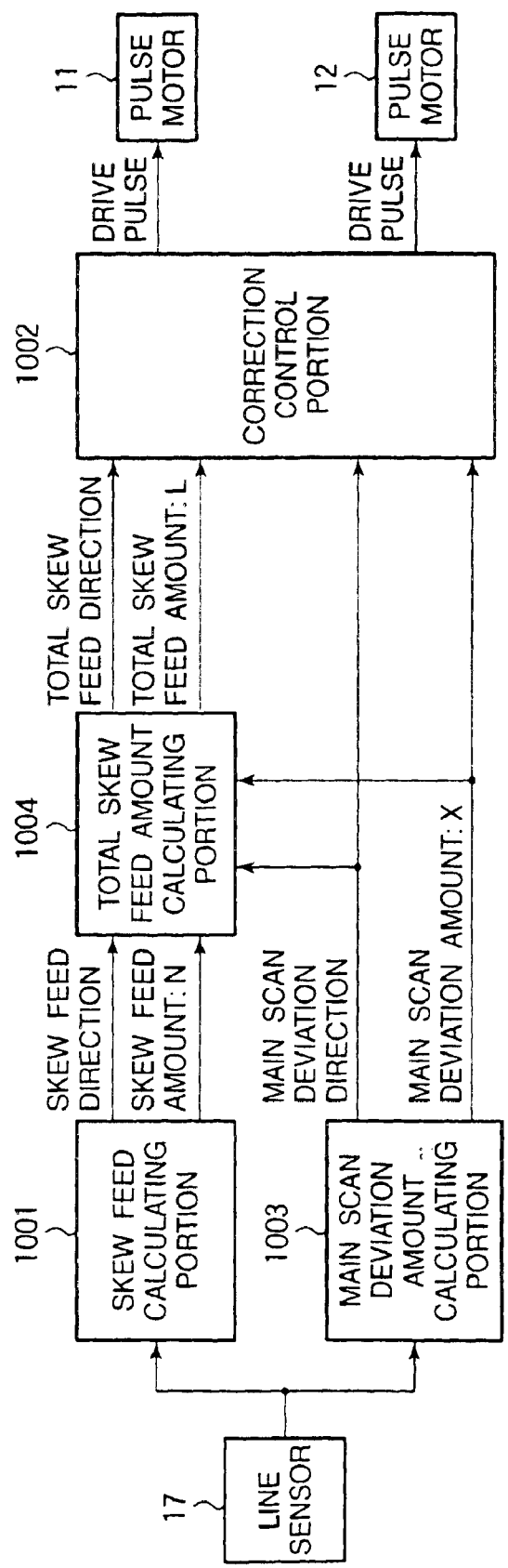
FIG. 10 is a block diagram illustrating the control construction of the third embodiment of the present invention.

FIG. 9 illustrates the construction of a sheet transporting apparatus according to the present embodiment, and in FIG. 9, the same members as the above-described members are give the same reference numerals, and need not be described. FIG. 10 is a block diagram illustrating the control construction of the sheet transporting apparatus according to the present embodiment.

In FIG. 10, the reference numeral 17 designates a sheet detecting line sensor which effects the detection of the transported state of the sheet. The reference numeral 1001 denotes a skew feed amount calculating portion which calculates the skew feed direction and skew feed amount N of the sheet on the basis of detection information from the sheet detecting line sensor 17. The reference numeral 1003 designates a main scan deviation amount calculating portion which calculates the main scan deviation direction and main scan deviation amount X of the sheet on the basis of the detection information from the sheet detecting line sensor 17.

The reference numeral 1004 denotes a total skew feed amount calculating portion which calculates the skew feed direction and skew feed amount M of the sheet after the main scan deviation correction based on the main scan deviation direction and the main scan deviation amount X transmitted from the main scan deviation amount calculating portion 1003 has been effected, and calculates a total skew feed direction as an overall skew feed direction and a total skew feed amount L as an overall skew feed amount from the skew feed direction and the skew feed amount N transmitted from the skew feed amount calculating portion 1001 and the skew feed direction and the skew feed amount M caused by the main scan deviation correction.

A correction control portion 1002 increases or decreases driving pulse numbers given to the right and left pulse motors 11 and 12, on the basis of the total skew feed direction and the total skew feed amount L transmitted from the total skew feed amount calculating portion 1004, and the main scan deviation direction and the main scan deviation amount X transmitted from the main scan deviation amount calculating portion 1003, and corrects the main scan deviation amount and skew feed amount of the transported sheet.

While in the present embodiment, the total skew feed amount calculating portion 1004 is of a construction discrete from the correction control portion 1002, this is not restrictive, but for example, the total skew feed amount calculating portion 1004 may be of a construction included in the correction control portion 1002.

Each of the skew feed amount calculating portion 1001, the correction control portion 1002, the main scan deviation amount calculating portion 1003 and the total skew feed amount calculating portion 1004 may be comprised, for example, of a controller provided with a CPU, a ROM, a RAM, etc., and may be of a construction which controls in accordance with the procedure of a flow chart which will be described later.

Figure 11A:
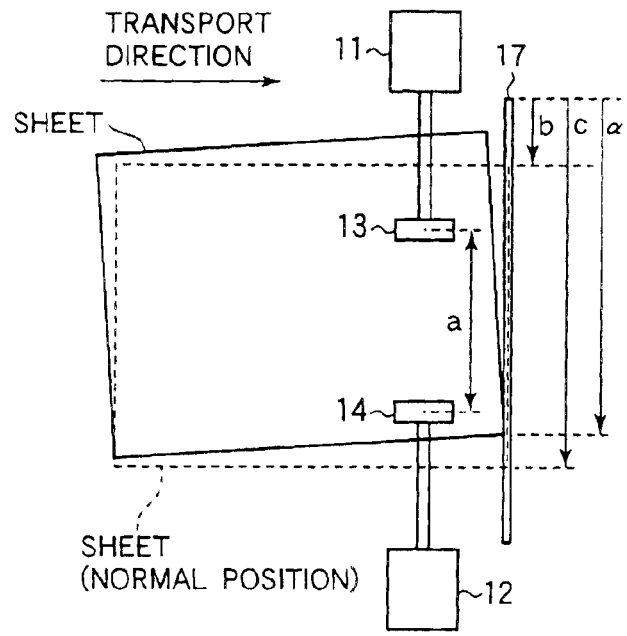
FIGS. 11A and 11B are typical views illustrating a main scan deviation detecting method and a skew feed detecting method in the third embodiment of the present invention.
Figure 11B:
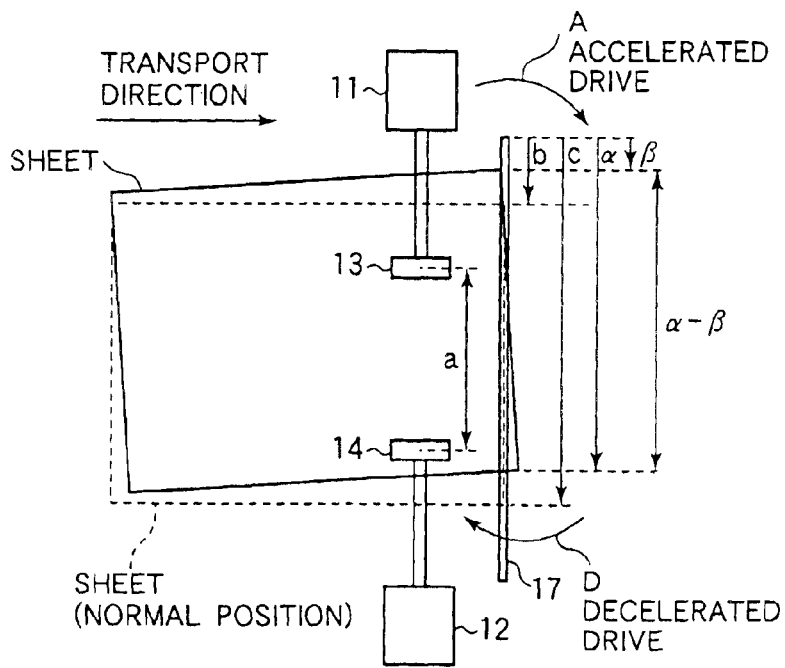

FIGS. 11A and 11B are typical views illustrating a method of detecting a sheet position in the sheet transporting apparatus shown in FIG. 9, and in these figures, the same members as those in FIG. 9 are given the same reference numerals.

For the calculation of the main scan deviation amount X, first, when the position at which the sheet has been first detected by the sheet detecting line sensor 17 is defined as α, and the widthwise positions which the sheet should originally pass are defined as "b" and "c" ("b" is the pulse motor 11 side, and "c" is the pulse motor 12 side), X is calculated from X=c−α(or X=b−α).

Next, for the calculation of the skew feed amount N, the time from after the sheet position has been first detected by the sheet detecting line sensor 17 until the detected position of the sheet by the sheet detecting line sensor 17 assumes a minimum value (or a maximum value) is counted at a constant frequency f to thereby measure a skew feed count number C. Next the detected skew feed amount Nb in the sheet detecting line sensor 17 itself is calculated from Nb=C×V/f by the use of the transporting speed V of the sheet. The skew feed amount N in the transporting roller portion actually used for the correction control portion 1002 to control the pulse motors 11 and 12 is calculated from N=Nb×b/a by the use of the detected skew feed amount Nb detected by the sheet detecting line sensor 17, the distance "a" between the transporting rollers and the distance "b" from the sheet detecting line sensor.

A method of correcting the main scan deviation amount and the skew feed amount in the sheet transporting apparatus according to the present embodiment will hereinafter be described with reference to a flow chart shown in FIG. 12.

Figure 12:
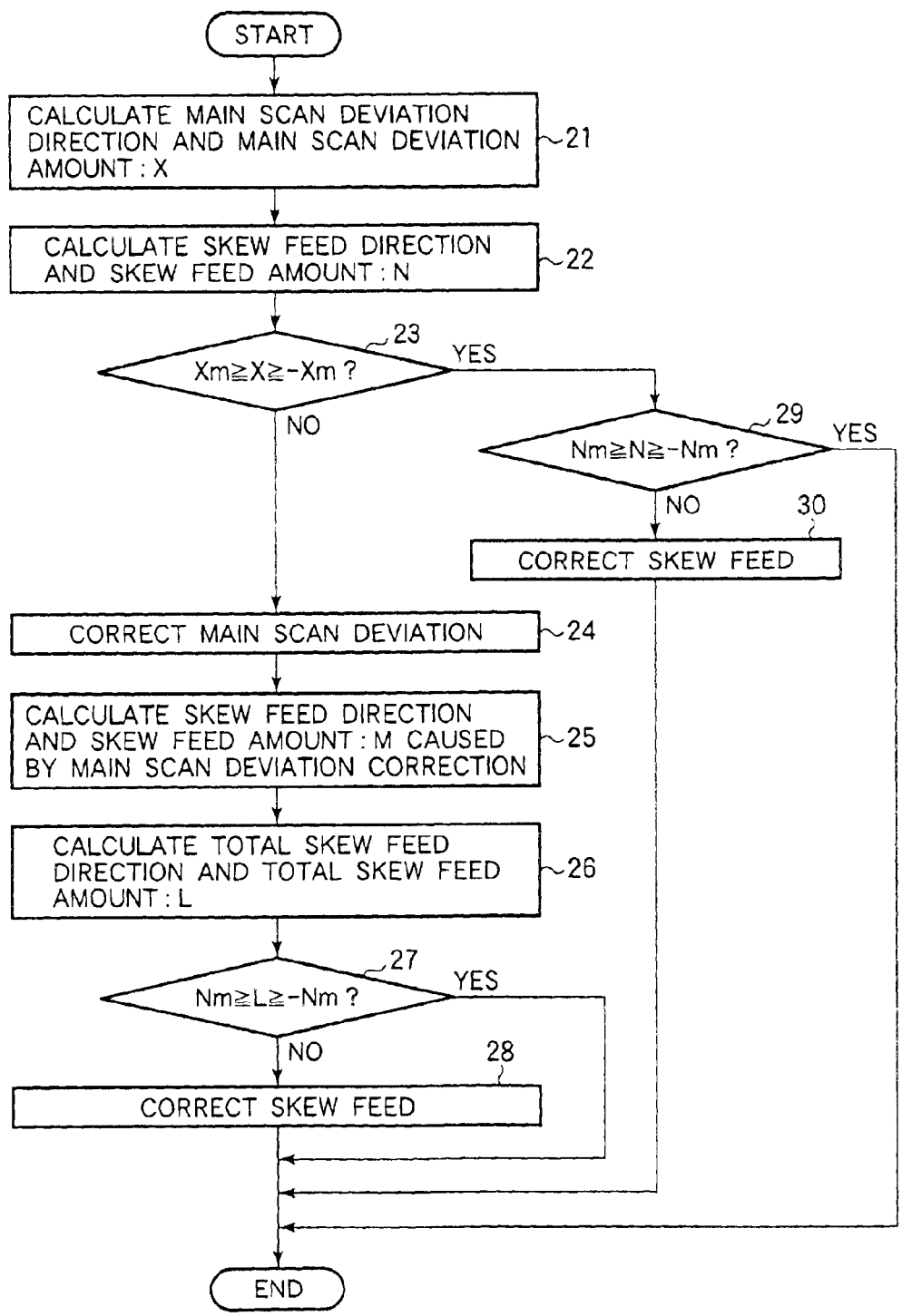
FIG. 12 is a flow chart illustrating the control procedure of effecting main scan deviation correction and skew feed correction in the third embodiment of the present invention.

FIG. 12 is a flow chart illustrating the procedure of the method of correcting the main scan deviation amount and the skew feed amount in the sheet transporting apparatus according to the present embodiment.

In FIG. 12, a main scan deviation allowable value determining the allowable range of the main scan deviation amount X is represented by Xm, and a skew feed allowable value determining the allowable range of the skew feed amount N is represented by Nm.

When at a step 21, the sheet detecting line sensor 17 detects the sheet, the main deviation amount calculating portion 1003 calculates the main scan deviation direction and the main scan deviation amount X.

When at a step 22, the detected position of the sheet by the sheet detecting line sensor 17 assumes a minimum value (or a maximum value), the skew feed amount calculating portion 1001 calculates the skew feed direction and the skew feed amount N.

At a step 23, the correction control portion 1002 judges whether the main scan deviation amount X is within an allowable range of −Xm≦X≦Xm, and when it is judged to be within the allowable range, at a step 29, the correction control portion 1002 judges whether the skew feed amount N is within an allowable range of −Nm≦N≦Nm, and when it is judged to be within the allowable range, processing is ended.

When at the step 23, the main scan deviation amount X is judged to be not within the allowable range of −Xm≦X≦Xm, at a step 24, main scan deviation correction is effected by the correction control portion 1002.

Next, at a step 25, the skew feed direction and the skew feed amount M caused by the main scan deviation correction are calculated by the total skew feed amount calculating portion 1004, and subsequently at a step 26, the total skew feed direction and the total skew feed amount L are calculated by the total skew feed amount calculating portion 1004 with the skew feed direction and the skew feed amount N obtained from the skew feed amount calculating portion 1001 being taken into account.

Next, at a step 27, the correction control portion 1002 judges whether the total skew feed amount L is within an allowable range of $-Nm \leq L \leq Nm$, and when it is judged to be within the allowable range, processing is ended.

When at the step 27, the total skew feed amount L is judged to be not within the allowable range of $-Nm \leq L \leq Nm$, at a step 28, skew feed correction is effected by the correction control portion 1002 by an amount corresponding to the total skew feed amount L calculated by the total skew feed amount calculating portion 1004.

When at a step 29, the skew feed amount N is judged to be not within an allowable range of $-Nm \leq N \leq Nm$, at a step 30, skew feed correction is effected by the correction control portion 1002 by an amount corresponding to the skew feed amount N calculated by the skew feed amount calculating portion 1001, and processing is ended.

Thus, main scan deviation correction is effected on the basis of the widthwise deviation direction, the widthwise deviation amount X, the skew feed direction and the skew feed amount N calculated on the basis of the detection of the transported sheet, whereafter the pulse motors 11 and 12 are drive-controlled in conformity with the total skew feed amount L from the above-calculated skew feed amount N and the skew feed amount M caused by the main scan deviation correction to thereby effect the correction of the main scan deviation amount and the correction of the skew feed amount at a time, whereby the sheet can be transported in a normal transported state.

It is also possible to supply a storage medium having recorded therein a program code of software for realizing the operation of the sheet transporting apparatus according to each of the above-described embodiment to a system or an apparatus having a computer or the like, and read out and execute the program code stored in this storage medium by the computer (or the CPU or MPU) of the system or the apparatus. In this case, the above-described system is not restricted to one having a single apparatus, but may be one having a plurality of apparatuses.

The sheet transporting apparatus according to each of the above-described embodiments can also be used as sheet transporting means in an image reading apparatus such as a scanner, or an image forming apparatus such as a printer or a facsimile.

What is claimed is:

1. An image forming apparatus comprising: a pair of sheet transporting members having rotary shafts provided coaxially with each other along a cross direction perpendicular to a transport direction of a sheet, and rotatively driven independently of each other to thereby transport the sheet;

detecting means extending along the cross direction for detecting a transported state of the sheet transported by said pair of sheet transporting members; and control means for controlling said pair of sheet transporting members on the basis of detection information of said detecting means to correct a sheet position in said cross direction and a skew feed posture of the sheet relative to the transport direction, wherein said detecting means is a line sensor arranged parallel to said cross direction, and a size of a detectable area in said cross direction by said line sensor is larger than a size in said cross direction of at least an area through which the transporting sheet passes.

2. An image forming apparatus according to claim 1, wherein said control means provides a transporting speed difference between said pair of sheet transporting members.

3. An image forming apparatus according to claim 1, wherein said detecting means is disposed upstream of said pair of sheet transporting members with respect to the transport direction of the sheet.

4. An image forming apparatus according to claim 1, wherein said detecting means is disposed downstream of said pair of sheet transporting members with respect to the transport direction of the sheet.

5. An image forming apparatus according to claim 1, wherein said control means controls said pair of sheet transporting members to correct a deviation of the sheet in the cross direction simultaneously with correcting a deviation of the sheet in a skew feed direction.

6. An image forming apparatus according to claim 1, further comprising calculating means for calculating, on the basis of the detection information of said detecting means, a movement direction and a movement amount of the sheet in said cross direction relative to a normal transported position, and a skew feed direction and a skew feed amount.

7. An image forming apparatus according to claim 6, wherein said calculating means calculates the skew feed direction and the skew feed amount after correcting a deviation in the cross direction of the sheet to thereby calculate a total skew feed direction and a total skew feed amount, and said control means controls said pair of sheet transporting members to correct a deviation in the skew feed direction of the sheet on the basis of said total skew feed direction and said total skew feed amount.

8. An image forming apparatus comprising:

a pair of sheet transporting members having rotary shafts provided coaxially with each other along a cross direction perpendicular to a transport direction of a sheet, and rotatively driven independently of each other to thereby transport the sheet;

detecting means extending along the cross direction for detecting a transported state of the sheet transported by said pair of sheet transporting members;

control means for controlling said pair of sheet transporting members on the basis of detection information of said detecting means to correct a sheet position in said cross direction and a skew feed posture of the sheet relative to the transport direction;

calculating means for calculating, on the basis of the detection information of said detecting means, a movement direction and a movement amount of the sheet in said cross direction relative to a normal transported position, and a skew feed direction and a skew feed amount, wherein said calculating means calculates the skew feed direction and the skew feed amount after correcting a deviation in the cross direction of the sheet to thereby calculate a total skew feed direction and a total skew feed amount, and said control means controls said pair of sheet transporting members to correct a deviation in the skew feed direction of the sheet on the basis of said total skew feed direction and said total skew feed amount.

* * * * *

UNITED STATES PATENT AND TRADEMARK OFFICE
CERTIFICATE OF CORRECTION

PATENT NO. : 6,862,081 B2
DATED : March 1, 2005
INVENTOR(S) : Takashi Soya

It is certified that error appears in the above-identified patent and that said Letters Patent is hereby corrected as shown below:

Column 9,
Line 15, "give" should read -- given --.

Column 12,
Line 49, "direction;" should read -- direction; and --.

Signed and Sealed this

Sixteenth Day of August, 2005

JON W. DUDAS
*Director of the United States Patent and Trademark Office*